United States Patent [19]

Lemelshtrich

[11] Patent Number: 4,721,331

[45] Date of Patent: Jan. 26, 1988

[54] QUICKLY ATTACHABLE CONNECTORS PARTICULARY FOR USE AS A HOSE COUPLER

[76] Inventor: Noam Lemelshtrich, Haeshel Street 57, Herzlia Pituach, Israel

[21] Appl. No.: 905,150

[22] Filed: Sep. 9, 1986

[30] Foreign Application Priority Data

Mar. 31, 1986 [IL] Israel .................................... 78369

[51] Int. Cl.[4] ........................................... F16L 37/14
[52] U.S. Cl. .................................... 285/305; 285/319; 285/423
[58] Field of Search ................ 285/305, 319, 321, 423

[56] References Cited

U.S. PATENT DOCUMENTS

| | | | |
|---|---|---|---|
| 3,753,582 | 8/1973 | Graham | 285/305 |
| 4,111,464 | 9/1978 | Asano et al. | 285/321 X |
| 4,423,892 | 1/1984 | Bartholomew | 285/305 X |
| 4,541,657 | 9/1985 | Smyth | 285/305 |
| 4,561,682 | 12/1985 | Tisserat | 285/319 X |
| 4,591,192 | 5/1986 | Van Exel | 285/305 |

*Primary Examiner*—Dave W. Arola
*Attorney, Agent, or Firm*—Benjamin J. Barish

[57] ABSTRACT

A female connector member for use in a quickly-attachable connector assembly with a male connector member comprises a housing formed with a socket for receiving the male connector member and further formed with a pair of circumferentially-spaced openings through a wall leading into said socket; and a locking member having a flexible arcuate section received on the outer face of the housing, and a pair of oblique locking elements normally projecting through the openings into the socket for locking the male connector member therein. The outer faces of the locking elements are inclined at an acute angle to the longitudinal axis of the socket and converge in the direction of the mouth of the socket, such as to facilitate the insertion of the male connector member into the socket by a small push force and to lock the male connector member against withdrawal from the socket even by a large pull force.

20 Claims, 5 Drawing Figures

QUICKLY ATTACHABLE CONNECTORS PARTICULARY FOR USE AS A HOSE COUPLER

BACKGROUND OF THE INVENTION

The present invention relates to quickly-attachable connector assemblies, and particularly to the female connector member of such an assembly. The invention is especially useful in hose couplers for connecting fluid-conducting hoses to each other or to a device supplied with the fluid conducted by the hose, and the invention is therefore described below with respect to such an application.

A large number of quickly-attachable connectors have been developed for hose couplers, electrical connectors, and the like, permitting the male connector member of the assembly to be quickly-attached and detached from the female connector member. Examples of some of the known connector assemblies are illustrated in U.S. Pat. Nos. 3,569,903; 3,468,562 and 4,216,982. The first-mentioned patent relates to an electrical connector, and the latter two relate to hose couplers. One of the disadvantages of the latter two hose couplers, however, is that they require, not only the male and female connector members and a locking member, but also a releasing member which is to be pushed in order to release the locking member.

Another known hose coupler obviates the need for the releasing member and instead provides a locking member having a flexible arcuate section formed with a a pair of locking elements which are moved to their releasing positions when the flexible arcuate section is pressed inwardly. Such a known hose coupler, however, requires a substantial push force in order to isert the male connector member into the female connector member. This is a significant disadvantage particularly since such hose couplers are widely used by housewives in the kitchen and garden.

SUMMARY OF THE INVENTION

An object of the present invention is to provide a female connector member for a quickly-attachable connector assembly having advantages over the known constructions in a number of respects as will be described more particularly below. Other objects of the invention are to provide a quickly-attachable connector assembly, including both female and male connector members, and also a hose coupler, having a number of advantages as will also be described more particularly below.

According to the present invention, there is provided a female connector member for use in a quickly-attachable connector assembly with a male connector member comprising: a housing formed with a socket open at one end for receiving the male connector member and further formed with a pair of circumferentially-spaced openings through a wall thereof leading into the socket; and a locking member having a flexible arcuate section received on the outer face of the housing, and a pair of locking elements normally projecting through the openings into the socket for locking the male connector member when inserted therein. The locking elements and the openings extend obliquely at an acute angle to the longitudinal axis of the socket converging in the direction of the open end of the socket, such as not only to facilitate the insertion of the male connector member into the socket by a small push force but also to lock the male connector member against withdrawal from the socket even by a large pull force. The flexibility of the arcuate section is sufficient such that pressing it radially inwardly increases its curvature to move the locking element outwardly to a releasing position with respect to the male connector member in the socket, permitting the male connector member to be withdrawn therefrom by a small pull force.

It will thus be seen that the movement of the locking elements is oblique to the direction of the insertion push force, and also to the direction of the withdrawing pull force. Since the oblique locking elements are thus displaceable in the oblique openings parallel to a component of the direction of insertion of the male connector member into the socket, a relatively small push force is required in order to insert the male connector member into the socket. Also the oblique locking elements are securely locked by a wedging action against displacement in the opposite direction, unless they are moved outwardly to their releasing positions by depressing the arcuate section of the locking member.

The foregoing structure and mode of operation of the oblique locking elements in the present application are to be distinguished from the known prior art devices, briefly mentioned above, wherein the movement of the locking elements is perpendicular to the direction of the (pushin) insertion and pull-out (withdrawal) forces. Thus, in these prior known devices, a relatively large force is required to insert the male connector member even if the engaged surfaces are bevelled; and if bevelled, the locking is less secure since a smaller pull-out will tend to move the locking elements to their releasing positions.

The arrangement of the present invention thus obviates the need for a separate releasing member, as in many prior art devices. At the same time it permits the male connector member to be inserted into the socket by the use of a relatively low push force, while locking it in the socket against even a large pull force, until the arcuate section of the locking member is pressed in order to release the male connector member for withdrawal.

According to another preferred feature of the present invention, the flexible arcuate section of the locking member is of a curved trapezoidal configuration and is received within a recess of a curved rectangular configuration formed in the outer face of the housing. The ends of the arcuate section of the locking member, engaging the ends of the recess in the outer housing face upon pressing the locking member, have cooperable cam surfaces to permit the arcuate section ends to slide over the ends of housing recess, and thereby to decreases the curvature of the arcuate section to move the locking elements outwardly by a snap action to releasing position.

Such a snap-action is particularly advantageous in that it more positively locks or releases the male connector member according to its two bistable positions, while at the same time it produces a better "feel" to the user when moving it from one bistable position to the other.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
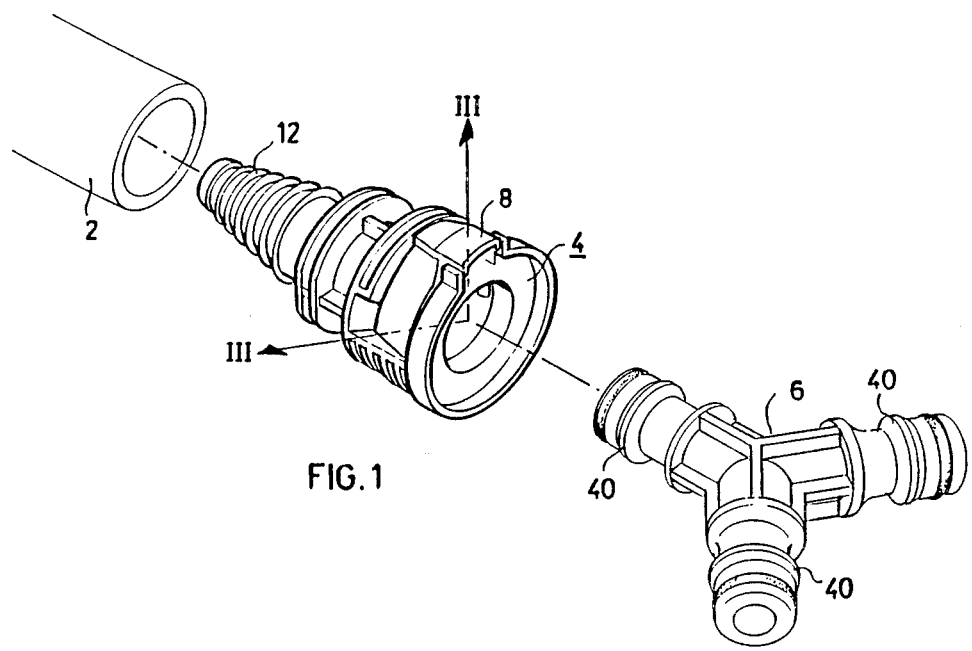
FIG. 1 is an exploded 3-dimensional view illustrating one form of quickly-attachable connector assembly constructed in accordance with the present invention.
Figure 2:
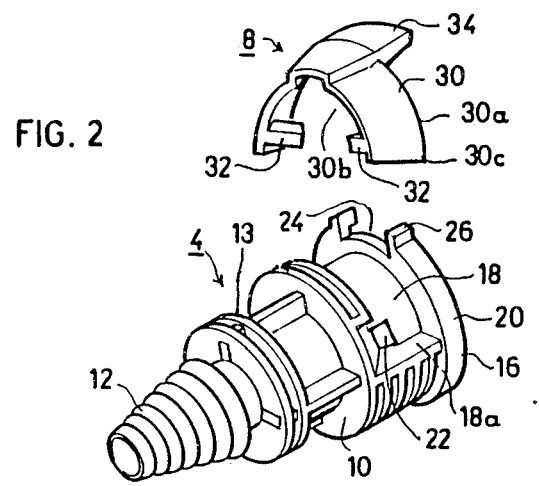
FIG. 2 is an exploded perspective view better illustrating the female connector member and the locking member in the connector assembly of FIG. 1.

The quickly-attachable connector assembly illustrated in FIG. 1 is for use as a hose coupler in order to attach a hose 2 to another hose or another device, such as a hand sprinkler or the like, for receiving water or other fluid delivered thereto by the hose. The connector assembly itself comprises three members, namely: a female connector member 4 coupled to hose 2, a male connector 6 for coupling to another hose and/or device using the fluid conducted by the hose, and a locking member 8 for locking the male connector member 6 within the female connector 4. FIG. 1 illustrates the locking member 8 attached to the female connector member 4, whereas FIG. 2, illustrating the locking member separated from the female connector member, better shows the construction of the locking member.

The male connector member 6 illustrated in FIG. 1 is of a known construction which has been generally standardized for use with female connector members of various constructions. It is shown in the Y-configuration for purposes of example, but may take other known forms. Accordingly, the remainder of the description concerns mainly the construction and operation of the female connector member 4 and the locking member 8, and includes only so much of the description of the male connector member 6 as necessary to describe the operation of members 4 and 8.

The female connector member 4 comprises a housing 10 formed with a nipple 12 at one end for receiving the hose 2, and with threads 13 for receiving a nut (not shown) securing the hose. Housing 2 is further formed with a central bore passing axially through it to its opposite end 16 defining a socket 14 (FIG. 3) having an open end for receiving the male connector member 6, which is inserted parallel to the longitudinal axis 36 of the socket. The outer face of housing 10 at its latter end is formed with a recess 18 (FIG. 2) extending for about ½ the circumference of the housing and separated from the housing end 16 by an annular rib 20. Housing 10 is further formed with a pair of circumferentially-spaced openings 22 through the wall of its recessed portion 18 adjacent to the ends of the recess. Only one such opening 22 is illustrated in FIG. 2, it being appreciated that the housing wall is formed with a second like opening at the opposite end of the recess.

Annular rib 20 is formed with a slot 24 extending from recess 18 to the outer end 20 of the housing. The ends of the annular rib 20 bordering slot 24 are extended, as shown at 26.

Locking member 8 comprises an arcuate section 30 receivable within recess 18 of housing 10, and with a pair of oblique locking elements 32 passing through openings 22 in the housing wall at its recess. Locking member 8 further includes a finger-gripping section 34 formed centrally of arcuate section 30 and extending past the arcuate section so as to be received within slot 24 of housing 10 when the locking member is applied to the housing with the arcuate section 30 received within recess 18.

Figure 3:
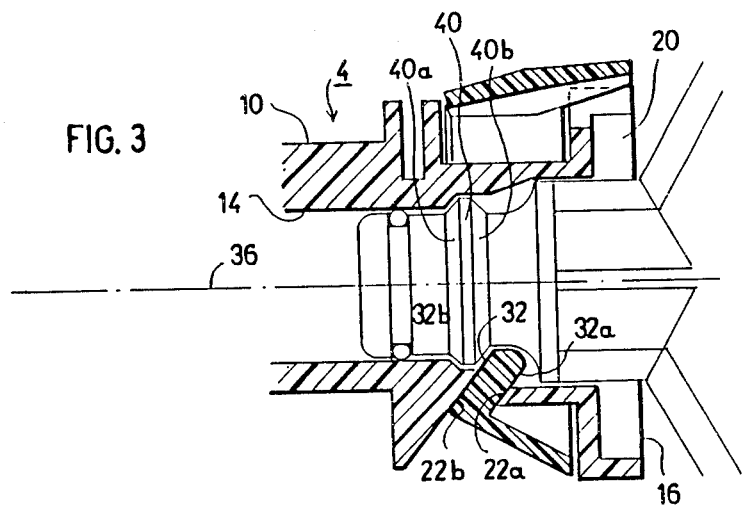
FIG. 3 is a fragmentary sectional view along lines III—III of FIG. 1 illustrating the connector assembly with the locking member in locking position, preventing withdrawal of the male connector member.
Figure 4A:
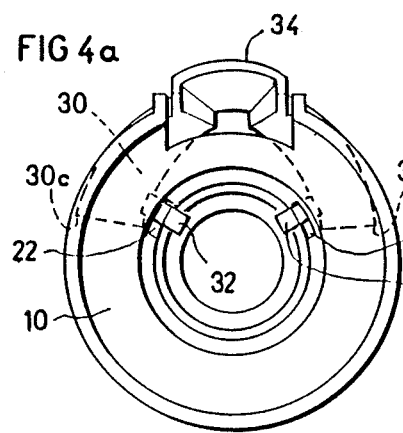
FIG. 4a is an end view illustrating only the female connector member and the locking member with the locking member in locking position as in FIG. 3.
Figure 4B:
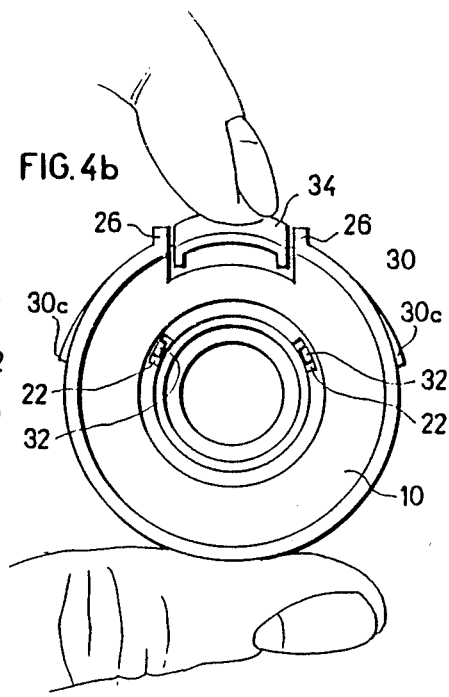
FIG. 4b is an end view illustrating the manner of pressing the locking member in order to move it to its releasing position to permit withdrawal of the male locking member.

As shown particularly in FIG. 3, each of the oblique locking elements 32 is inclined at an acute angle to the longitudinal axis 36 of socket 14 such as to converge in the direction of the open end of the socket of the female connector member housing 10. In addition, the two opposed faces 32a, 32b of each locking element 32 are formed with planar surfaces which are inclined at the same acute angle. The faces of housing 10 defining the two openings 22 in recesses portion 18, for receiving the locking elements 32, are also formed with opposed planar surfaces 22a, 22b inclined at the same acute angle as the locking elements 32. This acute angle is preferably from 30°–75°; FIG. 3 illustrates this angle at approximately 45°.

The arcuate section 30 of locking member 8, received within recess 18 of housing 10, is made of flexible material, such that when its finger-engaging element 34 is pressed radially inwardly, arcuate section 30 is flexed outwardly to decreases its curvature, and thereby to move its locking elements 32 outwardly through openings 22. This releases the male connector member 6 received within socket 14 of the female connector member 4. For this purpose recess 18 is of a curved rectangular configuration, but arcuate section 30 is of a curved trapezoidal configuration having a longer length along its outer edge 30a than its inner edge 30b; also, the opposite ends of recess 18 are tapered outwardly, as shown at 18a, to serve as a cam surface engageable with the outer corners 30c of the arcuate section 30 of the locking member 8. The arrangement is such, as will be described below, that pressing finger-engaging member 34 of arcuate section radially inwardly causes the outer corners 30c of the arcuate section 30 to slide over tapered faces 18a with a snap-action, to move the locking elements 32 to their releasing positions.

As mentioned earlier, the male connector member 6 is of a known construction which has been substantially standardized in connector assemblies of this type. At its end to be received within the female connector member 4, the male connector member 6 is formed with an annular rib 40 having a tapered leading face 40a (FIG. 3) and a tapered trailing face 40b. The two planar surfaces 32a, 32b formed in each locking element 32 of the locking member 8 are preferably at the same acute angle as the taper of the trailing surface 40b in the male connector member 6.

The connector assembly illustrated in the drawings operates as follows:

First, the locking member 8 is applied to the female connector member 4 by inserting the arcuate section 30 of locking member into recess 18 of the female connector member. When locking member 8 is so applied, its locking elements 32 are received within openings 22, and its finger-engaging element 34 is received within slot 24. This is the stable condition of the locking member, with its locking elements 32 stably assuming their extended positions, i.e., their locking positions, within socket 14 of the female connector member 4.

The male connector member 6 may then be attached in a quick manner to the female connector member 4 by merely pushing the male connector member into socket 14 of the female connector member 4. As this is done, the leading tapered surface 40a of the male connector member first engages surfaces 32a of the two locking elements 32, and as the male connector member is pushed further into socket 14, tapered surface 40a cams the locking elements 32 outwardly to permit the insertion of the male connector member. Because of the acute angle formed by the locking elements 32 with respect to the longitudinal axis 36 of the socket 14, converging towards the mouth of the socket, the locking elements move obliquely to the direction of the insertion force; i.e., they move parallel to a component of the insertion direction. Accordingly, very little force is required in order to move apart the locking elements. The male connector member ma thus be inserted into socket 14 with a relaively low push force.

Once annular rib 40 of the male connector member 6 has cleared the locking elements 32, the latter elements snap back into place behind rib 40 facing tapered surface 40b at the trailing end of this rib.

Locking elements 32 firmly hold the male connector member 6 within socket 14 even in the presence of a relatively large pull force tending to pull the male connector member from the socket. This is because of the oblique displacement of the locking elements 32 in the oblique openings 22 with respect to the longitudinal axis 36 of the socket 14. Thus, should such a pull force be applied to the male connector member 6, its tapered surface 40b engages inclined surface 32b of locking elements 32 and becomes wedged between surface 40b and surface 22a of housing 10 defining the respective opening 22. The male connector member 6 is thus firmly locked within socket 14 of the female connector member 4.

When it is desired to withdraw the male connector member, the finger-engaging element 34 of locking member 8 is pressed radially inwardly. Initially, this causes the corners 30c of the arcuate section 30 to move upwardly along inclined faces 18a at the ends of recess 18 to housing 10. When corners 30c clear the upper edges of these inclined faces, the resistance to its movement is decreased such that its continued movement is effected by a snap-action. This causes arcuate section 30 to flex outwardly with a snap-action, reducing its curvature and thereby moving its locking elements 32 to their released condition with respect to annular rib 40 of the male connector member 6. The male connector member may now be withdrawn with a very low pull force.

While the invention has been described with respect to its use in a quickly-attachable hose coupler, it will be appreciated that it could be used in other applications, for example in a quickly-attachable electrical connector. Many other variations, modifications and applications of the invention will be apparent.

What is claimed is:

1. A female connector member for use in a quickly-attached connector assembly with a male connector member having an annular locking rib, comprising:

a housing formed with a socket having a longitudinal axis and open at one end for receiving the male connector member when inserted parallel to the longitudinal axis of the socket, and further formed with a pair of circumferentially-spaced openings through a wall of the housing leading into said socket, said openings having edges;

and a locking member having a flexible arcuate section received on the outer face of said housing, a pair of locking elements normally projecting through said openings into said socket for locking the male connector member when inserted therein, and an abutting surface engageable with a surface of said housing and effective, when the arcuate section is pressed radially inwardly, to increase the curvature of said arcuate section and to move said locking elements outwardly to their releasing position with respect to the male connector member in the socket, permitting the male connector member to be withdrawn therefrom by a small pull force; characterized in that:

said locking elements and said openngs extend obliquely at substantially the same acute angle to the longitudinal axis of the socket converging in the direction of the open end of the socket, such that said locking elements are displaceable in said oblique openings at said acute angle to the direction of insertion of the male connector member into said socket by abutment with said annular locking rib of the male connector member when inserted into said socket, whereby the oblique locking elements facilitate the insertion of the male connector member into the socket by a small push force and are abutted by and wedged between said annular locking rib and the edges of said opening to lock the male connector member against withdrawal from the socket even by a large pull force.

2. The female connector member according to claim 1, wherein the opposed faces of said locking elements, and of the housing faces defining said openings receiving them, are planar surfaces inclined at said acute angle.

3. The female connector member according to claim 2, wherein said acute angle is from 30°-75°.

4. The female connector member according to claim 2, wherein said flexible arcuate section terminates in free ends and said oblique locking elements are located adjacent to the free ends of said flexible arcuate section, and form an acute angle of approximately 45°.

5. The female connector member according to claim 1, wherein said flexible arcuate section of the locking member is of a curved trapezoidal configuration and is received within a recess of a curved rectangular configuration formed in the outer face of the housing and said abutting surface provided with a corner, such that depressing the arcuate section causes opposed corners thereof to slide past the ends of said surface of said housing with a snap-action, thereby to move the locking elements with a snap-action outwardly to said releasing position.

6. The female connector member according to claim 5, wherein the ends of said surface of said housing are tapered outwardly, to facilitate said snap-action movement of the arcuate section upon pressing same.

7. The female connector member according to claim 1, wherein said hosuing is formed with a recess axially spaced from the housing open end by an annular wall formed with a slot extending axially to the open end of the housing, said locking member being received within said recess and formed with a finger-engaging portion centrally thereof extending axially through said slot to the open end of the housing.

8. A quickly-attachable connector assembly including a female connector member according to claim 1, in combination with a male connector member receivable in the socket of said female connector member.

9. The connector assembly according to claim 8, wherein the annular locking rib of said male connector member is formed with a tapered leading edge to facilitate its insertion into the socket of said female connector member by a small push force.

10. The connector assembly according to claim 9, wherein said annular locking rib of the male connector member is formed with a tapered trailing face forming the same angle to the longitudinal axis of the socket as the abutted surface of said locking elements.

11. A female connector member for use in a quickly-attachable connector assembly with a male connector member having an annular locking rib, comprising: a housing formed with a socket having a longitudinal axis and open at one end for receiving the male connector member and further formed with a pair of circumferentially-spaced openings through a wall of the housing leading into said socket; and a locking member having a flexible arcuate section received on the outer face of said housing, and a pair of locking elements normally projecting through said openings into said socket for locking the male connector member when inserted therein;

characterized in that said flexible arcuate section of the locking member is of a curved trapezoidal configuration and is received within a recess of a curved rectangular configuration formed in the outer face of the housing, the sides of said recess constituting cam surfaces engageable with the ends of said flexible arcuate section such that depressing the arcuate section causes opposed corners thereof to slide past the ends of said housing recess with a snap-action, thereby to move the locking elements with a snap-action outwardly to a releasing position.

12. The female connector member according to claim 11, wherein the ends of said housing recess are tapered outwardly to facilitate said snap-action movement of the arcuate section upon pressing same.

13. The female connector member according to claim 11, wherein said housing recess is axially spaced from the housing end by an annular wall formed with a slot extending axially to the end of the housing, said locking member being formed with a finger-engaging portion centrally thereof extending axially through said slot to the end of the housing.

14. The female connector member according to claim 11, wherein said locking elements are oblique elements carried adjacent to the opposite ends of said arcuate section and extend inwardly thereof at an acute angle to the longitudinal axis of the socket, converging in the direction towards the open end of the socket;

each of said openings being inclined at substantially the same acute angle to the longitudinal axis of the socket and converging in the direction of the open end of the socket, whereby the oblique locking elements are engageable by said annular locking rib of the male connector member, during its insertion into the socket, to move the locking elements in said oblique openings at said acute angle to the direction of insertion of the male connector member, and thereby facilitate the insertion of the male connector member into the socket by a small push force and also lock the male connector member against withdrawal from the socket even by a large pull force.

15. The female connector member according to claim 14, wherein the opposed faces of said oblique locking elements and of the housing faces defining said openings receiving them are planar surfaces inclined at said acute angle.

16. The female connector member according to claim 15, wherein said acute angle is from 30°–75°.

17. The female connector member according to claim 15, wherein said acute angle is approximately 45°.

18. The female connector member according to claim 1, wherein said socket is defined by a bore through said housing, the opposite end of said housing including a nipple for attaching a hose thereto.

19. A female connector member for use in a quickly-attachable connector assembly with a male connector member having an annular locking rib, comprising:

a housing formed with a socket having a longitudinal axis and open at one end for receiving the male connector member and further formed with a pair of circumferentially-spaced openings through a wall of the housing leading into said socket, said openings having edges; and a locking member having a flexible arcuate section received on the outer face of said housing, a pair of locking elements normally projecting through said openings into said socket for locking the male connector member when inserted therein, and an abutting surface engageable with a surface of said housing and effective, when the arcuate section is pressed radially inwardly, to increase the curvature of said arcuate section and to move said locking elements outwardly to their releasing position with respect to the male connector member in the socket, permitting the male connector member to be withdrawn therefrom by a small pull force;

said locking elements being oblique elements extending inwardly of the arcuate section at an acute angle to the longitudinal axis of the socket, converging in the direction towards the open end of the socket;

the opposed faces of said oblique locking elements, and the housing faces defining said openings receiving them, being inclined at substantially the same acute angle to the longitudinal axis of the socket converging in the direction of the open end of the socket, whereby the oblique locking elements are engageable by said annular locking rib of the male connector member, during its insertion into the socket, to move the locking elements in said oblique openings at said acute angle to the direction of insertion of the male connector member, and thereby facilitate the insertion of the male connector member into the socket by a small push force and also are wedged between said annular locking rib and the edges of said opening to lock the male connector member against withdrawal from the socket even by a large pull force.

20. The female connector member according to claim 19, wherein said flexible arcuate section of the locking member is of a curved trapezoidal configuration and is received within an recess of a curved rectangular configuration formed in the outer face of the housing and said abutting surface provided with a corner, such that depressing the arcuate section causes opposed corners thereof to slide past the ends of said surface of said housing with a snap-action, thereby to move the locking elements with a snap-action outwardly to said releasing position.

* * * * *

UNITED STATES PATENT AND TRADEMARK OFFICE
CERTIFICATE OF CORRECTION

PATENT NO. : 4,721,331
DATED : January 26, 1988
INVENTOR(S) : Noam Lemelshtrich

It is certified that error appears in the above-identified patent and that said Letters Patent are hereby corrected as shown below:

Column 2, line 26, change "(pushin)" to
-- push-in

Column 5, line 18, change "ma" to
-- may

Column 5, line 19, change "relaively" to
-- relatively

Column 5, line 60, in Claim 1, change "attached" to
-- attachable

Column 6, line 60, in Claim 7, change "hosuing" to
-- housing

Signed and Sealed this

Twelfth Day of July, 1988

*Attest:*

DONALD J. QUIGG

*Attesting Officer*  *Commissioner of Patents and Trademarks*